(12) United States Patent
Tzannes

(10) Patent No.: US 7,813,419 B2
(45) Date of Patent: *Oct. 12, 2010

(54) METHOD AND MULTI-CARRIER TRANSCEIVER WITH STORED APPLICATION PROFILES FOR SUPPORTING MULTIPLE APPLICATIONS

(76) Inventor: Marcos C. Tzannes, 121 LaEspiral, Orinda, MA (US) 94563

( * ) Notice: Subject to any disclaimer, the term of this patent is extended or adjusted under 35 U.S.C. 154(b) by 0 days.

This patent is subject to a terminal disclaimer.

(21) Appl. No.: 12/044,498

(22) Filed: Mar. 7, 2008

(65) Prior Publication Data

US 2008/0212660 A1 Sep. 4, 2008

Related U.S. Application Data

(63) Continuation of application No. 10/863,247, filed on Jun. 9, 2004, now abandoned, which is a continuation of application No. 09/663,758, filed on Sep. 15, 2000, now Pat. No. 6,778,596, which is a continuation-in-part of application No. 09/522,869, filed on Mar. 10, 2000, now Pat. No. 6,498,808.

(60) Provisional application No. 60/177,081, filed on Jan. 19, 2000, provisional application No. 60/161,115, filed on Oct. 22, 1999, provisional application No. 60/154,116, filed on Sep. 15, 1999, provisional application No. 60/124,222, filed on Mar. 12, 1999.

(51) Int. Cl.
*H04B 17/00* (2006.01)

(52) U.S. Cl. ...................................... 375/222

(58) Field of Classification Search ................. 375/222, 375/219, 220, 260, 349; 370/531, 545, 252, 370/255

See application file for complete search history.

(56) References Cited

U.S. PATENT DOCUMENTS 3,573,380 A 4/1971 Darlington 4,131,766 A 12/1978 Narasimha (Continued)

FOREIGN PATENT DOCUMENTS

EP 0473465 3/1992

(Continued)

OTHER PUBLICATIONS

Atungsiri et al., "Multirate Coding for Communications Link Adaptation", IEEE Proc.-Commun., vol. 144, No. 3, Jun. 1997, pp. 211-216.

(Continued)

*Primary Examiner*—Kevin Y Kim
(74) *Attorney, Agent, or Firm*—Schwabe, Williamson & Wyatt, P.C.

(57) ABSTRACT

A system and method for supporting multiple applications are described. A digital subscriber line system includes two transceivers in communication over a communication channel using multicarrier modulation. Application profiles are defined for characterizing transmission of information over the communication channel. Each application profile is a parameter set that is associated with a unique set of one or more applications that may become active between the transceivers and specifies the transmission requirements for such applications. Each transceiver stores the application profiles and transmits information over the communication channel according to the one of the stored application profiles. When a change in a number of applications active between the transceivers occurs, a second one of the application profiles is retrieved. The transceivers then transition to transmitting information over the communication channel according to the second application profile. The transitioning can occur without interrupting communication between the transceivers in order to retrain the transceivers. One of the transceivers transmits a message the other transceiver that specifies the second application profile and requests a transition to that second application profile. In one embodiment, the transceiver transmitting the request receives an inverted sync symbol from the other transceiver to synchronize use of the second application profile.

25 Claims, 5 Drawing Sheets

U.S. PATENT DOCUMENTS

| | | |
|---|---|---|
| 4,568,156 A | 2/1986 | Dane |
| 4,679,227 A | 7/1987 | Hughes-Hartogs |
| 4,731,816 A | 3/1988 | Hughes-Hartogs |
| 4,802,190 A | 1/1989 | Schouhamer Immink |
| 4,912,763 A | 3/1990 | Galand et al. |
| 5,048,054 A | 9/1991 | Eyuboglu et al. |
| 5,128,964 A | 7/1992 | Mallory |
| 5,206,886 A | 4/1993 | Bingham |
| 5,226,081 A | 7/1993 | Hinokimoto |
| 5,285,474 A | 2/1994 | Chow et al. |
| 5,327,574 A | 7/1994 | Monma et al. |
| 5,400,322 A | 3/1995 | Hunt et al. |
| 5,428,790 A | 6/1995 | Harper et al. |
| 5,452,288 A | 9/1995 | Rahuel et al. |
| 5,479,447 A | 12/1995 | Chow et al. |
| 5,497,398 A | 3/1996 | Tzannes et al. |
| 5,521,906 A | 5/1996 | Grube et al. |
| 5,533,008 A | 7/1996 | Grube et al. |
| 5,555,244 A | 9/1996 | Gupta et al. |
| 5,596,604 A | 1/1997 | Cioffi et al. |
| 5,598,435 A | 1/1997 | Williams |
| 5,625,651 A | 4/1997 | Cioffi |
| 5,636,246 A | 6/1997 | Tzanne et al. |
| 5,644,573 A | 7/1997 | Bingham et al. |
| 5,667,991 A | 9/1997 | Koller et al. |
| 5,682,419 A | 10/1997 | Grube et al. |
| 5,774,671 A | 6/1998 | Satoh |
| 5,812,599 A | 9/1998 | Van Kerckhove |
| 5,822,372 A | 10/1998 | Emami |
| 5,822,374 A | 10/1998 | Levin |
| 5,910,959 A | 6/1999 | Olafsson et al. |
| 6,009,122 A | 12/1999 | Chow |
| 6,011,814 A | 1/2000 | Martinez et al. |
| 6,052,411 A | 4/2000 | Mueller et al. |
| 6,072,779 A | 6/2000 | Tzannes et al. |
| 6,084,917 A | 7/2000 | Kao et al. |
| 6,091,713 A | 7/2000 | Lechleider et al. |
| 6,188,729 B1 | 2/2001 | Perkins |
| 6,266,348 B1 | 7/2001 | Gross et al. |
| 6,272,170 B1 | 8/2001 | Chu |
| 6,426,961 B1 * | 7/2002 | Nimmagadda ............... 370/493 |
| 6,449,288 B1 | 9/2002 | Chari et al. |
| 6,480,475 B1 | 11/2002 | Modlin et al. |
| 6,498,808 B1 | 12/2002 | Tzannes |
| 6,567,473 B1 | 5/2003 | Tzannes |
| 6,665,872 B1 | 12/2003 | Krishnamurthy et al. |
| 6,667,991 B1 | 12/2003 | Tzannes |
| 6,775,320 B1 | 8/2004 | Tzannes |
| 6,778,596 B1 | 8/2004 | Tzannes |
| 2002/0015421 A1 | 2/2002 | Abbas et al. |
| 2002/0080824 A1 | 6/2002 | Wingrove |
| 2004/0223510 A1 | 11/2004 | Tzannes |
| 2004/0223511 A1 | 11/2004 | Tzannes |
| 2007/0019755 A1 | 1/2007 | Tzannes |
| 2007/0133704 A1 | 6/2007 | Tzannes |

FOREIGN PATENT DOCUMENTS

| | | |
|---|---|---|
| EP | 0652677 | 5/1995 |
| EP | 0703685 | 3/1996 |
| EP | 0753947 | 1/1997 |
| EP | 0753948 | 1/1997 |
| EP | 0762701 | 3/1997 |
| EP | 0812087 | 12/1997 |
| EP | 0820168 | 1/1998 |
| EP | 0828363 | 3/1998 |
| EP | 0833474 | 4/1998 |
| EP | 0840474 | 5/1998 |
| EP | 0869647 | 10/1998 |
| EP | 0905948 | 3/1999 |
| EP | 0916193 | 5/1999 |
| JP | 04022235 A | 1/1992 |
| JP | 5316111 A | 11/1993 |
| JP | 5327796 A | 12/1993 |
| JP | 7183862 A | 7/1995 |
| JP | 11127218 A | 5/1999 |
| JP | 2000558624 A | 7/2002 |
| WO | WO 86/07223 | 12/1986 |
| WO | WO 97/15131 | 4/1997 |
| WO | WO 97/36384 | 10/1997 |
| WO | WO 98/10556 | 3/1998 |
| WO | WO 98/27665 | 6/1998 |
| WO | WO 98/57472 | 12/1998 |
| WO | WO 98/59476 | 12/1998 |
| WO | WO 99/16224 | 4/1999 |
| WO | WO 99/18701 | 4/1999 |
| WO | WO 99/20027 | 4/1999 |
| WO | 0002335 | 1/2000 |
| WO | WO 00/13387 | 3/2000 |
| WO | WO 01/13622 | 2/2001 |

OTHER PUBLICATIONS

Bingham "Multicarrier Modulation for Data Transmission; and Idea Whose Time Has Come", IEEE Communication Magazine, May 1990, pp. 5-14.

Bingham "RFI Suppression in Multicarrier Transmission System", Amati Communications, IEEE Communication Magazine; May 1996, pp. 1026-1030.

Cioffi "A Multicarrier Premier", Amati Communication Corporation and Standford University, pp. 1-18.

Shoham et al., "Efficient Bit Allocation for an Arbitrary Set of Quantizers", IEEE Transactions on Acoustics, Speech, and Signal Processing, vol. 36, No. 9, Sep. 1988, pp. 1445-1453.

"ITU-T Recommendation G.992.1" International Telecommunication Union, Jun. 1999, 256 pages.

"ITU-T Recommendation G.992.2" International Telecommunication Union, Jun. 1999, 179 pages.

International Search Report for International (PCT) Patent Application No. PCT/US00/25352, mailed Dec. 29, 2000.

Written Opinion for International (PCT) Patent Application No. PCT/US00/25352, mailed Nov. 20, 2001.

International Preliminary Examination Report for International (PCT) Patent Application No. PCT/US00/25352, mailed Jan. 21, 2002.

Examiner's First Report for Australian Patent Application No. 75835/00, mailed Aug. 11, 2003.

Official Action for Canadian Patent Application No. 2382519, mailed Sep. 10, 2007.

Official Action for European Patent Application No. 00965061.5, mailed Dec. 2, 2005.

Official Action for European Patent Application No. 00965061.5, mailed Jan. 22, 2007.

Preliminary Rejection (including translation) for Korean Patent Application No. 10-2002-7003424, dated Nov. 22, 2006.

Official Action for U.S. Appl. No. 10/863,247, mailed Sep. 7, 2007.

International Search Report, mailed Dec. 29, 2000, for PCT/US2000/025387.

Office Action, mailed Jan. 17, 2003, for U.S. Appl. No. 09/523,086.

Final Office Action, mailed May 15, 2003, for U.S. Appl. No. 09/523,086.

Notice of Allowability, mailed Sep. 9, 2003, for U.S. Appl. No. 09/523,086.

Office Action, mailed May 23, 2002, for U.S. Appl. No. 09/522,869.

Notice of Allowability, mailed Aug. 9, 2002, for U.S. Appl. No. 09/522,869.

Office Action, mailed Jul. 31, 2002, for U.S. Appl. No. 09/522,870.

Notice of Allowability, mailed Jan. 15, 2003, for U.S. Appl. No. 09/522,870.

International Search Report, mailed Jul. 7, 2000, for PCT/US2000/006392.

Office Action, mailed Jun. 27, 2006, for U.S. Appl. No. 11/409,336.

Office Action, mailed Jan. 16, 2003, for U.S. Appl. No. 10/145,054.

Office Action, mailed Jun. 20, 2003, for U.S. Appl. No. 10/145,054.

Office Action, mailed Jan. 29, 2004, for U.S. Appl. No. 10/145,054.
Office Action, mailed Jun. 18, 2004, for U.S. Appl. No. 10/145,054.
Office Action, mailed Jul. 14, 2004, for U.S. Appl. No. 10/653,271.
Office Action, mailed Nov. 24, 2006, for U.S. Appl. No. 10/663,801.
Office Action, mailed Jan. 23, 2006, for U.S. Appl. No. 11/246,162.
Office Action, mailed Mar. 7, 2005, for U.S. Appl. No. 10/962,589.
Office Action, mailed Jul. 12, 2005, for U.S. Appl. No. 11/144,645.
Office Action, mailed Apr. 4, 2007, for U.S. Appl. No. 11/675,369.
Office Action, mailed Nov. 15, 2006, for U.S. Appl. No. 11/534,843.
Office Action, mailed May 7, 2009, for Korean Patent Application No. 10-2002-7003424.
Office Action, mailed Oct. 23, 2008, for U.S. Appl. No. 12/013,043.
Office Action, mailed Oct. 11, 2007, for Canadian Patent Application No. 2382522.
Office Action, mailed Jul. 11, 2007, for U.S. Appl. No. 10/863,246.
Office Action, mailed Oct. 30, 2007, for U.S. Appl. No. 11/678,388.
Final Office Action, mailed Aug. 22, 2008, for U.S. Appl. No. 11/678,388.
Office Action, mailed Mar. 11, 2009, for U.S. Appl. No. 11/678,388.
Office Action, mailed Jan. 8, 2008, for U.S. Appl. No. 11/771,261.
Office Action, mailed Nov. 17, 2008, for U.S. Appl. No. 11/771,261.
Search Report, mailed Sep. 9, 2008, for European Patent Application No. 8012733.5.
Search Report, mailed Jul. 10, 2006, for European Patent Application No. 6007976.1.
Search Report, mailed Jul. 4, 2008, for European Patent Application No. 8009620.9.
Search Report, mailed Mar. 30, 1999, for European Patent Application No. 08019583.7.
Search Report, mailed Dec. 29, 2000, for European Patent Application No. 965061.5.
Office Action, mailed Feb. 13, 2003, for Australian Patent Application No. 200038762.
Office Action, mailed Aug. 12, 2003, for Australian Patent Application No. 200075846.
Office Action, mailed Aug. 11, 2003, for Australian Patent Application No. 200075835.
Office Action, mailed Feb. 27, 2004, for Australian Patent Application No. 2003204966.
Office Action, mailed Aug. 11, 2006, for Australian Patent Application No. 2005200136.
Office Action, mailed Jun. 4, 2003, for U.S. Appl. No. 10/351,402.
Office Action, mailed Mar. 11, 2008, for Canadian Patent Application No. 2369110.
John M. Cioffi, "A Multicarrier Primer" Amati Communications Corporation and Stanford University pp. 1-18, Sep. 6, 2006.
"Seamless data-rate change using punctured convolutional codes for time-varying signal-to-noise ratio", ICC 95 Seattle, Gateway to Globaliztion, 1995 IEEE International Conference on Communication, 1995, vol. 1, Jun. 18-22, 1995 pp. 342-346.
"DMT-based ADSL: Concept, Architecture, and performance" IEEE Oct. 19, 1994, pp. 3/1-3/5, XPOO6503444.
"Simulation and Experimental Studies on the Concept of a Rate-Adaptive Digital Subscriber Loop (RA-DSL)" IEEE Journal on Selected Areas in Communication, IEEE Service Center, Piscataway, NJ, US, vol. 9, No. 6, Aug. 1991, pp. 941-950, XP001188185, USSN: 0733-8716.
Office Action, mailed Jan. 25, 2010, for JP Application 2001-524319, 4 pages.
Office Action, mailed Nov. 9, 2009, for U.S. Appl. No. 11/771,261.
Office Action, mailed Oct. 26, 2009, for JP Application No. 2007-234604.
Office Action, mailed Nov. 2, 2009, for JP Application No. 2007-060099.
Office Action, mailed Oct. 26, 2009, for JP Application No. 2000-604585.
Office Action, mailed Nov. 18, 2009, for U.S. Appl. No. 12/013,043.
Office Action, mailed Oct. 26, 2009, for JP Application No. 2001-524318.
Office Action, mailed Oct. 26, 2009, for JP Application No. 2007-212849.
Office Action, mailed Jun. 10, 2009, for EP Application 8012733.5.
"A series of new chipset models—Transmission scheme is bipolarized in CAP and DMT" Nikkei Electronics, Japan, Nov. 18, 1996, pp. 104-108.
"Dual PLL Synthesizer for PHS Cell Station", Yoshihisa Suzuki; Kenji Shibata and Junichi Kimurra, National Technical Report, Japan, Matsushita Electric Industrial Co., Ltd., Aug. 1996, vol. 42, No. 4, pp. 9-13.

* cited by examiner

METHOD AND MULTI-CARRIER TRANSCEIVER WITH STORED APPLICATION PROFILES FOR SUPPORTING MULTIPLE APPLICATIONS

RELATED APPLICATIONS

This application is a continuation of U.S. application Ser. No. 10/863,247 filed Jun. 6, 2009, which is a continuation of U.S. application Ser. No. 09/663,758 filed Sep. 15, 2000 now patented as U.S. Pat. No. 6,778,596, which is continuation-in-part of co-pending U.S. patent application Ser. No. 09/522,869, filed on Mar. 10, 2000, now patented as U.S. Pat. No. 6,498,808, which claims the benefit of and priority to U.S. provisional application Ser. No. 60/124,222, filed Mar. 12, 1999, entitled "Seamless Rate Adaptive (SRA) ADSL System", U.S. provisional application Ser. No. 60/161,115, filed Oct. 22, 1999, entitled "Multicarrier System with Stored Application Profiles", and U.S. provisional application Ser. No. 60/177,081, filed Jan. 19, 2000, entitled "Seamless Rate Adaptive (SRA) Multicarrier Modulation System and Protocols. This application also claims the benefit of and priority to U.S. provisional application Ser. No. 60/154,116, filed Sep. 15, 1999, entitled "Transceiver Supporting Multiple Applications", and U.S. provisional application Ser. No. 60/177,081, filed Jan. 19, 2000, entitled "Seamless Rate Adaptive (SRA) Multicarrier Modulation System and Protocols, which co-pending provisional applications are incorporated herein by reference in their entirety.

FIELD OF THE INVENTION

This invention relates to transmission systems using multicarrier modulation. More particularly, the invention relates to multicarrier transmission systems that support multiple applications.

BACKGROUND

In a conventional multicarrier transmission system, transceivers communicate over a communication channel using multicarrier modulation or Discrete Multitone Modulation (DMT). Carriers or subchannels spaced within a usable frequency band of the communication channel are modulated at a symbol transmission rate of the system. In ADSL (Asynchronous Digital Subscriber Line) systems, the symbol rate is approximately 4 kHz. Every 250 microseconds, the transmitting transceiver allocates a new set of bits for transmission to the subchannels so that the bit error rates of the subchannels are substantially equal at the receiving transceiver. Consequently, for a given symbol period the numbers of bits may vary from subchannel to subchannel.

ITU (International Telecommunication Union) standards G.992.1 and G.992.2 specify parameters that characterize the operation of ADSL DMT transceivers. Examples of parameters, to name but a few, include the data rate (b/s) for the connection between the transceivers, the number of subchannels in the upstream and downstream directions, and the number of bits allocated to each subchannel. In general, such parameters remain fixed after the initial configuration and installation of the transceiver. Some parameters depend on the data rate of the connection and may change when the ADSL connection is at a high or low data rate. Some parameters may change when channel conditions change. However, after the type of application is determined, i.e., voice, data, video, etc., the parameters are optimized and fixed for that application.

For splitterless operation, described in the ITU G.922.2 standard, ADSL transceivers store "channel profiles," which include a subset of parameters that are used when conditions of the communication channel change (e.g., a telephone goes off the hook). When the channel conditions change because of an event that the ADSL transceiver does not control (e.g., a telephone connected to the same wire as the ADSL transceiver goes off hook), the ADSL transceiver must identify the new channel condition, retrain some of the receiver functions (e.g., equalizers, echo cancellers, etc.), and switch to the channel profile that is used for the new channel condition. This process, defined as a "Fast Retrain" procedure in ITU G.922.2, takes approximately 1-2 seconds. These channel profiles, however, depend solely on the channel condition and not on the application(s) executing on the ADSL connection.

As technological advances increase the data rate throughput for multicarrier transmission systems, ADSL transceivers are becoming capable of supporting multiple applications. To support multiple applications, it is necessary that the ADSL transceiver be able to quickly and efficiently adapt the transmission parameters as the number and type of active applications change over time. For example, if the ADSL transceiver is accessing data over the Internet when a voice telephone call that is being transported over the ADSL connection becomes active, the ADSL transceiver must be able to modify the transmission parameters to accommodate both active applications. As other voice telephone calls and different applications (e.g.,. video on demand, video conferencing) become activated and deactivated over the ADSL connection, the ADSL transceiver must also be able to support the various transmission requirements of the various combinations of concurrently active applications. For example, video signals have higher reliability but lesser transmission delay requirements than voice and data signals. For some transmission systems, it has been necessary to find a compromise between high reliability and transmission delay.

Thus, there remains a need for a system and method that can support the various transmission requirements of multiple active applications as the number and type of active applications change over time.

SUMMARY OF THE INVENTION

One objective is to provide a DMT transceiver that can support multiple applications and quickly and efficiently modify transmission parameters over time as applications are activated and deactivated. In one aspect of the invention, a multicarrier modulation system has two transceivers in communication with each other over a communication channel. In one aspect of the invention, a multicarrier modulation system has two transceivers in communication with each other over a communication channel. The invention features a method for supporting a plurality of applications. A plurality of application profiles is defined. Each application profile corresponds to a unique set of one or more applications and specifies at least one transmission parameter for each application in that unique application set for transmitting information associated with that application over the communication channel.

The plurality of application profiles is stored at one of the transceivers. Information is transmitted according to a first stored application profile that corresponds to a set of currently active applications. A second stored application profile is selected in response to a change in the set of currently active applications. This second application profile corresponds to the one or more applications in the changed set of currently active applications. The transmission of information transitions to the use of the second stored application profile, without interrupting communication between the transceivers in order to retrain the transceivers.

A message is transmitted to one of the transceivers, identifying the second application profile as the application profile to use for subsequent communications between the transceivers. The message can operate to request a transition to the second application profile. Either a receiver or a transmitter of a transceiver can send the message to initiate the transition.

A reply message is received from the transceiver to which the message was transmitted. When the receiver sent the initial message, the reply message grants the request and synchronizes use of the second application profile. In one embodiment, an inverted sync symbol is used for the reply message. When the transition is transmitter-initiated, the reply message grants the request to transition to the second application profile. Then, another message is sent, acknowledging the grant and synchronizing use of the second application profile. In one embodiment, this other message is an inverted sync symbol.

Each application profile can be transmitted to the other transceiver over the communication channel with or without performing a full initialization of the transceivers. Application profiles can be generated upon an initial occurrence of a unique set of active applications, and associated with that unique application set. In one embodiment, each of the transceivers locally generates at least one of the transmission parameters for one of the stored application profiles using a predefined process employed by both transceivers. In other embodiments, transceivers can be preconfigured with the stored application profiles.

In an application profile, the transmission parameters specified for each application includes at least one of: a transmission data rate, subchannels allocated for downstream and upstream transmission, a number of bits allocated to each of the subchannels, performance margin, fine gain adjustments for each of the subchannels, interleave depth, a minimum and a maximum QAM constellation size, a length of a cyclic prefix, a codeword size, a framing mode, and trellis code.

In another aspect, the invention features a method for supporting multiple applications that are active between the transceivers. A plurality of application profiles is developed for characterizing transmission of information over the communication channel. Each application profile is associated with a unique set of one or more applications that may become active between the transceivers. The application profiles are stored at the transceivers. Information is transmitted over the communication channel according to a first stored application profile that corresponds to a set of currently active applications. A second one of the application profiles that corresponds to the changed set of currently active applications is retrieved in response to a change in the set of currently active applications that are active between the transceivers. The transceivers transition to transmitting information over the communication channel according to the second application profile. The transitioning can occur with or without retraining the transceivers.

In still another aspect, the invention features a method for supporting a plurality of applications in which a plurality of application profiles are defined. Each application profile corresponds to a unique set of one or more applications and specifies at least one transmission parameter for each application in that unique application set for transmitting information associated with that application over the communication channel. The plurality of application profiles is stored at one of the transceivers.

In yet another aspect of the invention, a multicarrier modulation system has a transceiver communicating over a communication channel. A plurality of application profiles is defined. Each application profile corresponds to a unique set of one or more applications and specifies at least one transmission parameter for each application in that unique application set for transmitting information associated with that application over the communication channel.

The plurality of application profiles is stored at the transceiver. Information is transmitted according to a first stored application profile that corresponds to a set of currently active applications. A second stored application profile is selected in response to a change in the set of currently active applications. This second application profile corresponds to the one or more applications in the changed set of currently active applications. The transmission of information transitions to the use of the second stored application profile, without having to retrain the transceiver. The transceiver can transmit or receive a message that identifies the second application profile as the application profile to use for subsequent communications.

In still another aspect of the invention, each application profile corresponds to a unique set of one or more applications and specifies at least one reception parameter for each application in that unique application set, for receiving information associated with that application over the communication channel. The reception of information transitions from using the first stored application profile to use of the second stored application profile without having to retrain the transceiver. Again, the transceiver can transmit or receive a message that identifies the second application profile as the application profile to use for subsequent communications.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DESCRIPTION OF THE INVENTION

Figure 1:
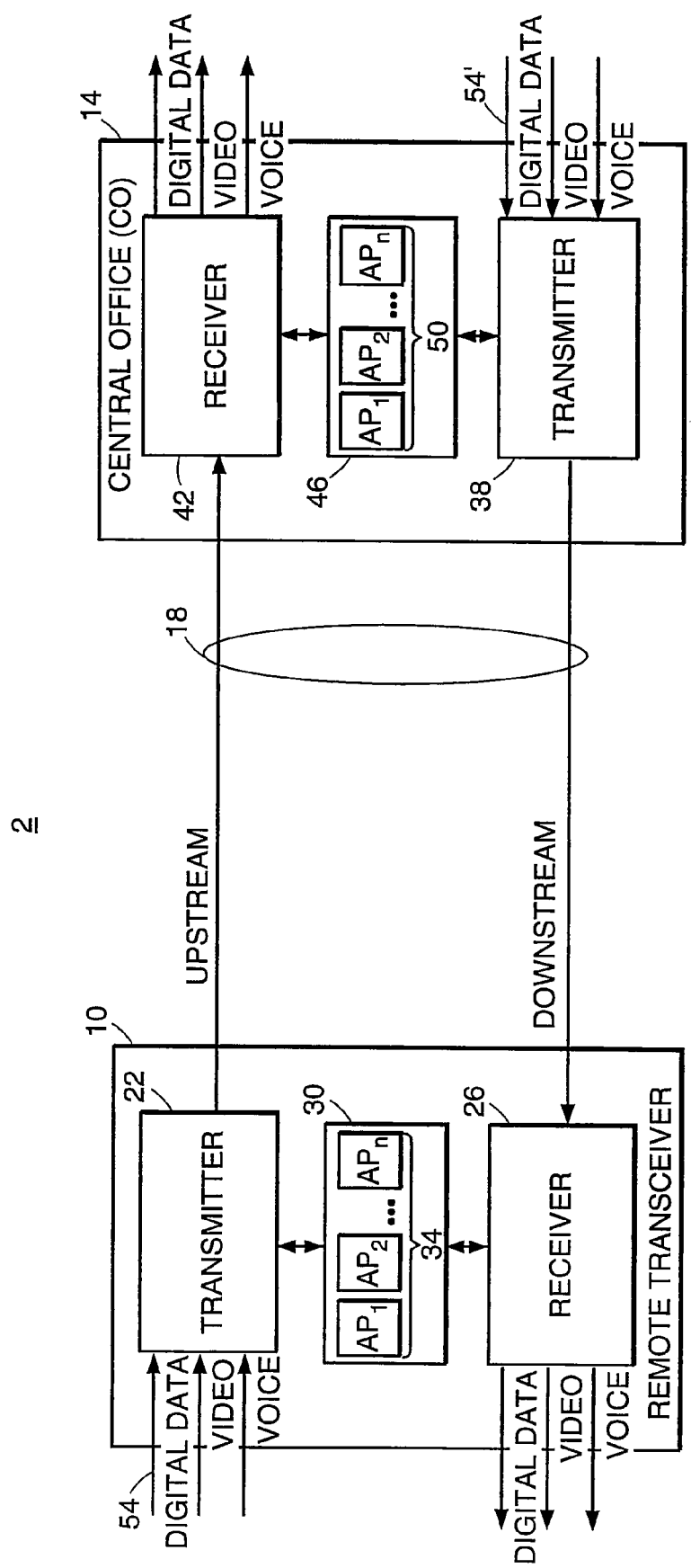
FIG. 1 is a block diagram of an embodiment of a digital subscriber line multicarrier transmission system including a remote DMT (discrete multitone modulation) transceiver in communication with a central office transceiver and supporting multiple applications using application profiles in accordance with the principles of the invention.

FIG. 1 shows an asymmetric DSL transmission system 2 including a remote discrete multitone modulation (DMT) transceiver 10 (e.g., a modem) in communication with a central office (CO) transceiver 14 over a communication channel 18. The remote DMT transceiver 10 includes a transmitter 22, a receiver 26, and memory 30 storing a plurality of application profiles (AP) 34 in accordance with the principles of the invention. The CO transceiver 14 includes a transmitter 38, a receiver 42, and memory 46 storing a plurality of application profiles 50 that have a one-to-one correspondence with the application profiles 34 of the remote DMT transceiver 10.

The communication channel 18 in one embodiment is a pair of twisted wires of a telephone subscriber line. The communication channel 18 provides an upstream transmission path from the transmitter 22 of the remote DMT transceiver 10 to the receiver 42 of the CO transceiver 14, and a downstream transmission path from the transmitter 38 of the CO transceiver 14 to the receiver 26 of the remote DMT transceiver 10. The system 2 is asymmetric in that the bandwidth of the downstream transmission path is greater than the bandwidth of the upstream transmission path.

The remote DMT transceiver 10 and the CO transceiver 14 receive and transmit application streams 54, 54' (generally 54) using the application profiles 34, 50 in accordance with the principles of the invention. Each application stream 54 (hereafter, referred to as an application 54) conveys one type of signal (e.g., digital data, voice, video, etc.). For example, a stream of voice signals is one application, a stream of digital data signals is another application, and a stream of video signals is yet another application. Voice applications correspond to one or more active voice telephone calls. An example of a digital data application are Internet access Web browsing (IAWB), and an example of a video application is video-on demand. The ADSL system 2 may also transmit applications 54 comprised of other signal types. Although shown as separate applications streams, the application streams can arrive at the transceiver 10, 14 as part of a single stream of transmission packets (e.g., ATM cells) having the various types of signals.

The ADSL system 2 supports multiple active applications 54 concurrently; For example, the transmitter 22 of the remote DMT transceiver 10 can concurrently transmit signals of a voice application and signals of a digital data application to the receiver 42 of the CO transceiver 14 over the upstream transmission path of the communication channel 18. As another example, FIG. 1 shows the ADSL system 2 concurrently transmitting signals associated with digital data, voice, and video applications 54 over the upstream and downstream transmission paths.

At any given point in time, the DSL system 2 has zero, one, or more applications 54 that are currently active. Each unique combination of one or more active applications, hereafter referred to as a set of applications or application set, represents an unique active communication state of the transceivers 10, 14. Examples of application sets 54 include: two or more concurrently active applications of different types (e.g., an Internet access Web browsing application together with a voice telephony application comprised of one or more voice telephone calls). Other examples of sets of active applications have only one active application (e.g., an Internet access Web browsing application, or one or more active voice telephone calls).

Each application 54 falls into one of two categories of applications: (1) fixed data rate applications, and 2) variable data rate applications. Fixed data rate applications require a specific bandwidth, and must obtain that bandwidth in order to pass over the communication channel 18. If the required data rate is presently unavailable, then the application is not presently supported. An example of a fixed data rate application is a voice telephony application that requires 64 kb/s for each active telephone call. Some video applications may also require a specific fixed data rate. Variable data rate applications can operate over a range of data rates (e.g., 1 Mb/s to 2 Mb/s). Thus, if the available channel bandwidth falls into this range, the application is supportable. An example of a variable data rate application is a digital data application (e.g., Internet access Web browsing). Some video applications are other examples of variable data rate applications that can operate within a data rate range.

Such data rate requirements determine, in part, the content of the application profiles 34, 50, as described in more detail below. In general, application profiles 34, 50 that support one or more fixed data rate applications specify the specific data rate requirement for each such fixed data rate application. Application profiles 34, 50 that support variable data rate applications specify up to the maximum amount of available data rate that falls within the range of the particular variable data rate applications. Application profiles 34, 50 that support both fixed data rate and variable data rate applications first allot the specific data rate requirements to the specific fixed data rate application(s) and then allot the remaining available bandwidth to the variable data rate application(s).

Different types of applications 54 typically also have different transmission and reception requirements for reliability and transmission delay. More specifically, the requirements for data rate, latency, burst or impulse noise, bit error rate (BER), and data rate symmetry can vary significantly for different applications. For example, high-speed video applications are asymmetric, requiring a high downstream data rate, e.g., 1.5 Mb/s to 6 Mb/s, and a low upstream data rate, e.g., 16 kb/s to 64 kb/s. In addition, because video signals are highly compressed when transmitted, video applications have low immunity to impulse noise. Consequently, video applications require a low BER of <1E-9. A high latency of >20 ms is acceptable.

In contrast, digital data applications, such as Web browsing over the Internet, are less asymmetric that video applications, using downstream data rates ranging between 32 kb/s to 6 Mb/s and upstream data rates between 32 kb/s to 1 Mb/s. Bit error rate requirements for digital data applications are <1E-7, generally being immune to impulse noise more than video applications. Also, a moderate latency of <5 ms is generally acceptable.

Voice applications (i.e., telephone calls) are symmetric, requiring a 64 kb/s data rate in both the upstream and downstream transmission paths. Having a high immunity to impulse noise, voice applications can have a BER of <1E-3. In contrast to video and digital data applications, a low latency of approximately less than 1.5 ms is required.

Other types of applications may have other requirements.

Various digital multitone transmission (or reception) parameters control these requirements. For example, bit allocation tables (BAT) control the data rate and the bit error rate. Reed-Solomon (R/S) coding controls and interleaving provides a lower bit error rate; both increase immunity to impulse noise at the expense of increased latency. The number of tones used in the upstream and downstream paths determines data rate symmetry. Consequently, a variety of parameters characterize the DMT transmission and reception of signals associated with a given application 54 over the communication channel 18. (Hereafter, such parameters are referred to generally as transmission parameters although such parameters are also used in the reception of signals.) Such transmission parameters include:

the data rate (in bits/second) for the given application (upstream and/or downstream) between the transceivers 10, 14;

the subchannels allocated in the upstream and downstream transmission paths for the given application;

the number of bits allocated to each subchannel for the given application;

the minimum and maximum quadrature amplitude modulation (QAM) constellation size used on each subchannel for the given application;

the inclusion or exclusion of a trellis code for the given application;

the length of the cyclic prefix for the given application;

coding parameters (e.g., R/S codeword size) for the given application;

the interleaver depth, if an interleaver is used for the given application;

the framing mode (e.g., the ITU ADSL transmission standards G.922.1 specify four different framing modes) for the given application;

the fine gain adjustments made to each tone for the given application; and the performance margin for the given application.

To transmit and receive signals associated with one or more active applications, the remote DMT transceiver 10 and the CO transceiver 14 use the application profiles 34, 50 to characterize such communications. More specifically, each application profile. 34, 50 is a parameter set that specifies the transmission parameters for a unique set of one or more presently active applications 54. Application profiles corresponding to application sets that represent only one active application specify the transmission parameters for that one application. As described below, the values assigned to the parameters of each application profile 34, 50 depend upon the category and type of each application in the application set corresponding to that application profile.

For application sets that represent two or more concurrently active applications, the corresponding application profile 34, 50 specifies transmission parameters that concurrently accommodate every active application in that application set. In effect, the application profile 34, 50 operates to combine the individual transmission (or reception) requirements of the individual applications 54 into a single transmission parameter set that achieves concurrent transmission of every active application.

For example, assume that the total data rate of a connection is 1.532 Mb/s. When a variable data rate application (e.g., a digital data application) is running alone, it uses the full available data rate of 1.532 Mb/s, presuming that this data rate is within the range of data rates for the variable data rate application. Thus, one embodiment of the application profile, corresponding to this variable data rate. application, allots the full available data rate of the connection to the variable data rate application. When a fixed data rate application (e.g., voice application) is running alone, it uses the specifically required data rate (e.g., a 64 kb/s data rate for a voice application). Thus, one embodiment of the application profile, corresponding to this fixed data rate application, allots the specifically required data rate to the fixed data rate application.

When the above-described fixed and variable data rate applications run concurrently, the application profile corresponding to this set of two applications provides first for the data rate requirements of the fixed data rate application and then for the variable data rate application using the channel bandwidth that remains after satisfying the fixed data rate application. Thus, if the fixed data rate application is a voice application requiring 64 Kb/s, the application profile specifies the required 64 Kb/s for the voice application and allots the remaining channel bandwidth of 1.468 Mb/s data rate to the variable data rate application. As another example, if the fixed data rate application is a voice application comprised of two voice calls, each requiring 64 Kb/s, the application profile specifies the required 128 Kb/s for the voice application and gives the remaining channel bandwidth of 1.404 Mb/s data rate to the variable data rate application. In these examples, it is presumed that the reduced bandwidth for the variable data rate application (i.e., from 1.532 Mb/s to 1.468 Mb/s or 1.404 Mb/s) falls within the range of acceptable data rates of the variable data rate application. In effect, the parameters associated with transmitting and receiving signals for each of the active applications individually are combined within the application profile in a manner that achieves the simultaneous transmission and reception of signals for all of the concurrently active applications.

Although shown above to specify the data rate for particular applications, each application profile 34, 50 may specify one or any combination of the parameters described above and other unlisted parameters for characterizing the DMT transmission (and reception) of signals associated with each application in that application profile. For example, other transmission parameters that the application profile 34, 50 can specify are the number of latency paths required to support the applications in the application profile, and the data rate of each latency path.

As another example, application profiles can also specify the allocation of subchannels to applications. For example, assume that when a variable data rate application is running alone, the corresponding application profile allocates every available subchannel to carry bits associated with the variable data rate application. Further assume that when a fixed data rate application is running alone, the corresponding application profile allocates a subset of the available subchannels sufficient to achieve the specifically required data rate (e.g., a 64 kb/s data rate for a voice application) of the fixed data rate application. When these fixed and variable data rate applications run concurrently, the application profile corresponding to this set of two applications specifies the allocation of some subchannels to the fixed data rate application, and other subchannels to the variable data rate application. Possibly, one or more of the subchannels are allocated to both the fixed and variable data rate applications.

Application profiles are further illustrated by the following five examples of application profiles, AP #1-AP #5, which can be developed and stored at the transceivers 10, 14. These exemplary profiles specify the transmission characteristics for five different communication states involving two types of applications, a fixed data rate voice application comprised of one or more voice calls and a variable data rate Internet access Web browsing (IAWB) application. For these examples, assume that the total data rate of the connection (e.g., upstream) between the transceiver 10, 14 is 1.532 Mb/s, and that the IAWB application has a minimum and maximum data rate range of 1 Mb/s to 2 Mb/s. Each voice call of the voice application requires 64 kp/s. In general, the fixed data rate applications receive the data rate that each requires, and the variable data rate receives the balance of the bandwidth capacity of the connection.

Application Profile #1

Application profile #1 (hereafter, also AP #1) corresponds to an application set of only one variable data rate application, the IAWB application with the data rate range of 1 Mb/s and 2 Mb/s. Thus, AP #1 specifies the full connection capacity (here, 1.532 Mb/s) for transmitting signals associated with the IAWB application. All useable subchannels are allocated to the IAWB data stream with a 1E-7 BER on each subchannel. An R-S codeword size is 200 bytes with interleaver depth of 5 codewords.

Application Profile #2

Application profile #2 (hereafter, also AP #2) corresponds to an application set of only one fixed data rate application, a voice telephone (VT) application requiring 64 kb/s. Thus, AP #2 specifies 64 kp/s for transmitting signals associated with the VT application. A subset of the subchannels sufficient to achieve 64 kb/s is allocated to the VT data stream with a 1E-3 BER on each subchannel. There is no coding or interleaving.

Application Profile #3

Application profile #3 (hereafter, also AP #3) corresponds to an application set of only one fixed data rate application, specifically, one voice application comprised of two voice telephone (VT) calls on separate voice channels, each call requiring 64 kb/s. Accordingly, AP #3 specifies a data rate of 128 kb/s (i.e., 2×64 kb/s) for transmitting signals associated with this VT application. A subset of the subchannels sufficient to achieve 128 kb/s is allocated to the VT data stream with a 1E-3 BER on each subchannel. Again, there is no coding or interleaving.

Application Profile #4

Application profile #4 (hereafter, also AP #4) corresponds to an application set of two applications of different types, specifically, the variable data rate IAWB application and one fixed data rate VT application. For transmitting signals associated with the IAWB and VT applications, AP #4 specifies the data rate for the VT stream as 64 kb/s and for the IAWB stream as 1.468 Mb/s (1532 kb/s-64 kb/s). A subset of the subchannels sufficient to achieve 64 kb/s is allocated to the VT stream with a 1E-3 BER on each subchannel so allocated. A subset of the subchannels sufficient to achieve 1.468 Mb/s is allocated to the IAWB stream with 1E-7 BER on each subchannel so allocated. For the IAWB stream, there is an R-S codeword size of 200 bytes with an interleaver depth of 5 codewords; for the VT stream, there is no coding or interleaving.

Application Profile #5

Application profile #5 (hereafter, also AP #5) corresponds to an application set of two applications; the variable data rate IAWB application and one fixed data rate VT application comprised of two voice telephone calls on separate channels, each call requiring 64 kb/s. For transmitting signals associated with the IAWB and the VT applications, AP #5 allots a 128 kb/s data rate for the VT stream and a 1.404 Mb/s (1532 kb/s-128 kb/s) data rate for the IAWB stream. A subset of the subchannels sufficient to achieve 128 kb/s is allocated to the VT data stream with a 1E-3 BER on each subchannel so allocated. A subset of the subchannels sufficient to achieve 1.404 Mb/s is allocated to the IAWB stream with 1E-7 BER on each subchannel so allocated. For the IAWB stream, there is an R-S codeword size of 200 bytes with an interleaver depth of 5 codewords; again, for the VT stream, there is no coding or interleaving.

As applications 54 become active and inactive over time, the remote DMT transceiver 10 and the CO transceiver 14 use the stored application profiles 34, 50 to change the transmission parameters quickly and efficiently and thereby accommodate the transmission requirements of the currently active application(s). Whenever a change occurs to the set of currently active applications, the remote DMT transceiver 10 and CO transceiver 14 select the appropriate application profile from the stored set of profiles 34, 50. In one embodiment, if an application profile does not yet exist for the current set of active applications, one of the transceivers 10, 14 generates the appropriate application profile and exchanges that new application profile with the other transceiver over the communication channel 18. In other embodiments the transceivers 10, 14 can be configured with predefined application profiles and/or dynamically generate application profiles during the operation of the ADSL system 2 as the need for such profiles arises. In another embodiment, the transmission parameters in the application profiles are exchanged during initialization. In yet another embodiment, transmission parameters in the application profiles are mutually generated by each transceiver 10, 14 locally.

Figure 2:
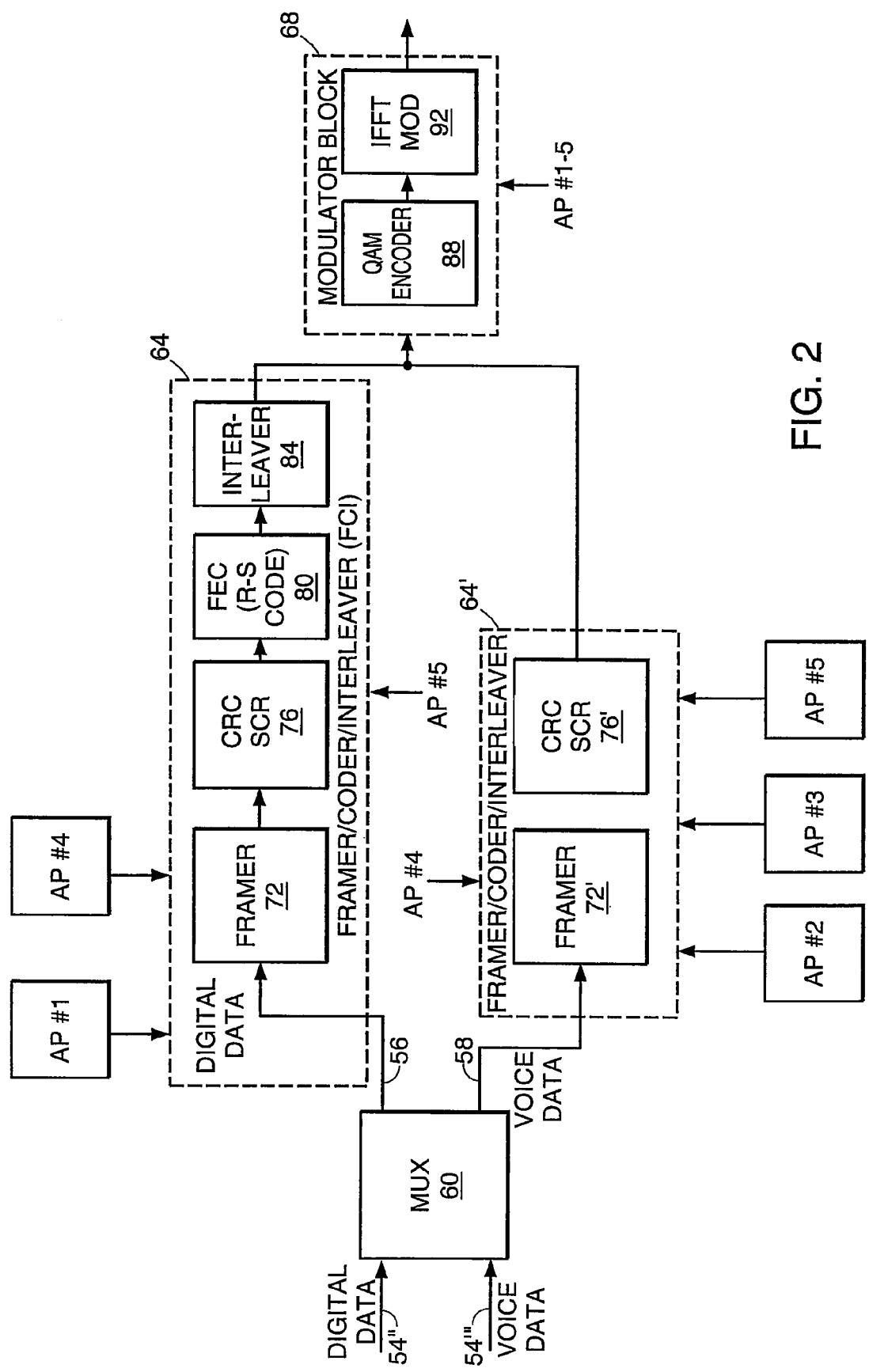
FIG. 2 is a block diagram of an embodiment of a transmitter of the remote DMT transceiver having two latency paths for supporting multiple applications with different latency requirements.

FIG. 2 shows an exemplary embodiment of the transmitter 22 of the remote DMT transceiver 10 including two latency paths 56, 58 for supporting multiple applications 54 with different latency requirements. The transmitter 38 of the CO transceiver 14 comprises equivalent paths and functions as the transmitter 22. The receivers 26, 42 also comprise equivalent latency paths, but in reverse order and performing inverse operations than those of the transmitters 22, 38 to demodulate the information received over the communication channel 18.

The multiple latency paths 56, 58 are used to send different application bit streams with different latency requirements through the ADSL DMT transceiver 10. In FIG. 2, two different applications 54", 54'" are shown. One exemplary application 54" is a digital data stream (e.g., and ATM (asynchronous transfer mode) data stream) and the other exemplary application is a voice telephony application. It is to be understood that additional and/or different applications can be used, and that the use of the digital data and voice telephony applications is merely illustrative of the principles of the invention. The digital data application 54" can tolerate a moderate amount of latency (i.e., less than approximately 5 ms) and is sent through the latency path 56, which has interleaving. The voice telephony application 54'" with low latency requirements is sent through the other latency path 58, which has no interleaving.

The transmitter 22 can have additional and/or different latency paths. For example, in one embodiment, the ADSL system 2 has a video application in addition to the digital data and voice telephony applications. This video application can tolerate a higher latency that the moderate latency of the ATM data application 54" and the low latency of the voice telephony application 54'". For this embodiment, the ADSL system 2 can accommodate the latency requirements of the video application by providing a third, different latency path.

Each latency path 56, 58 includes three blocks: a MUX block 60, a framer/coder/interleaver (FCI) block layer 64, 64', and a modulator block 68. The MUX block 60 has multiple inputs for receiving the signal streams of the active applications 54 and an output for each latency path 56, 58. The MUX block 60 directs the signal stream of the digital data application 54" to the first latency path 56 and the signal stream of the voice data application 54'" to the second latency path 58.

Each FCI block 64, 64' (generally 64) provides functionality associated with preparing a stream of bits for modulation, transforming the received signals into frames and superframes, adding overhead channel (i.e., AOC and EOC) information the frames, and if applicable, coding and interleaving. The operations performed by each FCI block 64 depends upon the type of application 54", 54'" and the latency path 56, 58 taken by that application.

On the first latency path 56, the FCI block 64 includes a framer block 72, a cyclic redundancy check (CRC) and scrambler (SCR) block 76, a forward error correction (FEC) block 80 (e.g., R-S Coding), and an interleaving (INT) block 84. On the second latency path 58, the FCI block 64' includes a framer block 76' and a CRC and SCR block 80'. The second latency path 58 through the FCI block 64' has a different (i.e., lesser) amount of latency than the first path 56 because the second path 58 does not perform interleaving or coding on the voice stream.

The modulator block 68 provides functionality associated with DMT modulation and includes a quadrature amplitude modulation (QAM) encoder 88 and an inverse Fast Fourier transform (IFFT) 92. The QAM encoder 88 has multiple inputs to receive and combine the signal streams from the latency paths 56, 58 into a single signal stream that is sent to the IFFT 92 for modulation. The IFFT 92 modulates bits received from the QAM encoder 88 into the multicarrier subchannels of the communication channel 18.

Also shown in FIG. 2 are the five exemplary application profiles, AP #1-AP #5, which are described in FIG. 1. Application profiles #1, #4, and #5 are in communication with the FCI block 64 of the first latency path 54 because each of these profiles specifies one or more transmission parameters that characterizes the ATM data stream. Application profiles #2, #3, #4, and #5 are in communication with the FCI block 64' of the second latency path 58 because each of these profiles specifies one or more transmission parameters that characterize the voice stream. In one embodiment, all five of the application profiles, AP #1-AP #5, are in communication with the Modulator block 68 because each profile specifies one or more transmission parameters that characterize the allocation of bits to subchannels of the communication channel 18.

Storing and Exchanging Application Profiles

Predefined Profiles

Before the transceivers 10, 14 can communicate over the communication channel 18 using an application profile to characterize such communications, that application profile is stored in the appropriate local memory 30, 46. In one embodiment, each transceiver 10, 14 is preconfigured (e.g., factory set); that is, the application profile is already stored in the local memory 30, 46 before the transceivers 10, 14 are incorporated into the ADSL system 2.

Profiles Exchanged and Stored Upon First Occurrence of an Application Set

Figure 3:
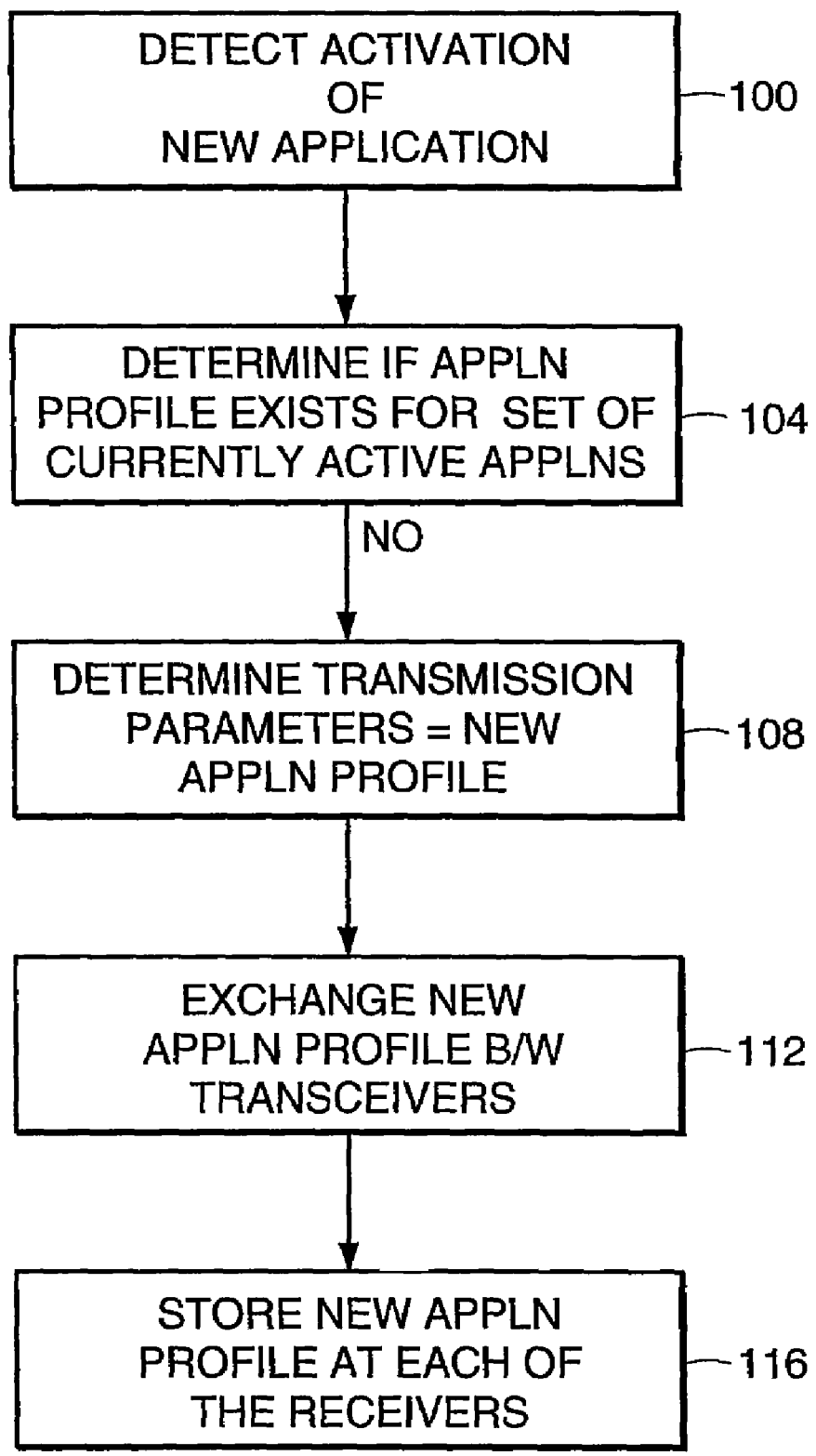
FIG. 3 is a flow diagram of an embodiment of a process for initially exchanging and storing the application profiles at the central office and the remote DMT transceivers.

In another embodiment, the transceivers 10, 14 exchange the application profile over the communication channel 18 and then store the application profile. FIG. 3 shows an embodiment of a process used to accomplish the profile exchange. For the purpose of illustrating the process, assume that the remote DMT and CO transceivers 10, 14 are exchanging signals associated with an Internet access Web browsing (IAWB) application according to the AP #1 of FIG. 1, when a new voice application becomes activated, resulting in the need of a new application profile. In general, either the remote DMT transceiver 10 or the CO transceiver 14 can act as the initiator of an exchange of the new application profile. More specifically, either the transmitter 22 or the receiver 26 of the remote DMT transceiver 10, or the transmitter 38 or the receiver 42 of the CO transceiver 14 can initiate the new application profile exchange.

During the exchange of IAWB signals, the activation of the new voice application 54 is detected (step 100). Either transceiver 10, 14 or other component of the DSL system 2 (e.g., a computer system within which the transceiver 10, 14 operates) may make this detection. Upon the detection of this new voice application 54, a determination is made (step 104) as to whether an application profile for the combination of the active IAWB application and the new voice application already exists. Again, the transceiver 10, 14 or another component of the DSL system 2 may make this determination. When such an application profile does not exist, transmission parameters are determined (step 108) that accommodate the concurrent transmission of signals associated with the IAWB application and the new voice application. Note that the deactivation of an active application can also result in a unique set of currently active applications for which there does not presently exist an application profile. In such an event, transmission parameters are likewise determined (step 108) for transmitting signals associated with the one or more applications that are currently active after the deactivation.

These transmission parameters represent a new application profile. One embodiment of this new application profile can be application profile #4 (AP #4), as described above FIG. 1, because AP #4 supports one IAWB application and one voice application. An identifier is associated with the new application profile. For example, if at the time of activation of this new application there are already three stored application profiles, the new application profile becomes the fourth. Because of the one-to-one correspondences between application profiles at the CO transceiver 14 as those at the remote DMT transceiver 10, the same identifier is to be used by the remote DMT 10 and CO transceivers 14 to identify the new application profile.

One of the transceivers 10, 14 then exchanges the new application profile with the other transceiver 14, 10, sending (step 112) the transmission parameters associated with the new application profile over the communication channel 18 using the AOC or EOC channel. In one embodiment, transmission of this new application profile operates as a message requesting use of the new application profile.

Profiles Exchanged and Stored During Full Initialization

In another embodiment, the transceivers 10, 14 exchange the new application profile with each other using the ITU compliant "Full Initialization" protocol of the G.992.2 or G.992.1 ITU standards, or a similar initialization protocol that interrupts the application data communication between the transceivers 10, 14 in order to train and exchange transmission information between transceivers. Use of the Full Initialization protocol causes approximately a 10-second drop in the link. This 10-second interruption occurs only once, upon the first occurrence of a unique set of currently active applications for which a new application profile is exchanged and subsequently stored. In another embodiment, upon initialization the transceivers 10, 14 negotiate the application to be supported and exchange profiles corresponding to all possible combinations of active applications.

After the application profile is exchanged, the transceivers 10, 14 store (steps 116) the application profile in local memory, 30, 46. Consequently, when a new voice application is activated while the transceivers 10, 14 are communicating according to AP #1 (FIG. 1), the transition to the stored AP #4 (FIG. 1) occurs quickly, as described in more detail below, because the exchange of the application profile over the communication channel 18 is not performed; the exchange is unnecessary.

Locally Generating Parameters in an Application Profile

In the exchange of the new application profile between transceivers 10, 14, the transceivers 10, 14 do not need to exchange every transmission parameter of the new application profile over the communication channel 18. In one embodiment, the each transceiver 10, 14 can locally develop one or more transmission parameters (e.g., the allocation of subchannels to applications) and store the locally developed parameter in the appropriate application profile. The local development of such transmission parameters can occur when initially developing or updating an application profile.

For example, assume that the transceivers 10, 14 are running two applications: a digital data application and a voice application. The transceivers 10, 14 exchange information with each other indicating that the connection supports these two applications. Based on the exchange of this information, each transceiver 10, 14 locally generates one or more transmission parameters for the application profile that corresponds to the two applications. Because both transceivers 10, 14 mutually generate these transmission parameters, the transceivers 10, 14 do not exchange the locally generated transmission parameters with each other over the communication channel 18. Other transmission parameters, such as those associated with framing, coding, and interleaving, are still determined in the information exchange between the transceivers 10, 14.

Mutually generating transmission parameters has the advantage of reducing or eliminating lengthy exchange messages when initially developing or updating an application profile. For example, if changes in channel conditions result in a decrease in the total data rate of the channel 18, resulting in a lower bit capacity for some of the subchannels, then typically, the transceivers 10, 14 would need to exchange updates with each other for all application profiles that specify those affected subchannels. By mutually generating transmission parameters in the application profiles, the transceivers 10, 14 can each locally update the application profiles without having to exchange the update information with each other.

The following three examples illustrate the use of mutually generated parameters as applied to the allocation of subchannels to two applications, here a digital data application and a voice application. Each example shows an application profile that specifies the allocation subchannels to the applications as a transmission parameter: (1) one application profile for when the digital data application runs alone, (2) another for when the voice application runs alone, and (3) another for when the digital data and voice applications run concurrently.

For the first application profile, the transceivers 10, 14 each locally allocate all of the available data rate and useable subchannels to the digital data application after establishing the connection. Other transmission parameters that are not mutually generated by the transceivers 10, 14, e.g., those parameters associated with framing, coding, and interleaving, are determined in the information exchange between the transceivers 10, 14.

For the second application profile, the transceivers 10, 14 allocate 64 kb/s to the voice application, regardless of the data rate capability of the connection. Each transceiver 10, 14 uses a predetermined technique (e.g., specified by a standard) to select the subchannels that are allocated to carry the 64 kb/s of the voice application. Examples of schemes that iterate through the available subchannels to select subchannels for the voice application include: (1) ascending from a subchannel with the lowest frequency to subchannels with higher frequencies; (2) descending from an available subchannel with the highest frequency to subchannels of lower frequencies; (3) ascending from a subchannel with the least number of bits to subchannels with higher numbers of bits; and (4) descending from a subchannel with the most number of bits to subchannels with lesser numbers of bits. Again, the transceivers 10, 14 can frame, code, and interleave in a predefined manner or as determined during the exchange during initialization.

For the third application profile, each transceiver 10, 14 allocates 64 kb/s to the voice application and the remaining data rate to the digital data application. Similar to the second application profile, each transceiver 10, 14 uses a predetermined technique for choosing the subchannels that are allocated to carry the voice application (e.g., subchannels of the highest or lowest frequency or of the smallest or largest constellations). Also, framing, coding, and interleaving are predefined or determined during the exchange as described above.

The transceivers 10, 14 use a coordinated numbering scheme for the locally generated application profiles (e.g., #6=digital data application only, #7=voice application only #8=digital data and voice applications together). The numbering scheme can be predefined or the transceivers 10, 14 can exchange the numbering scheme over the communication channel 18.

The principles of the invention extend to embodiments with more than the two applications. For such embodiments, to generate corresponding application profiles for each of the possible active applications, individually and in combination, the transceivers 10, 14 follow prescribed rules for selecting the application profile transmission parameters and their corresponding parameter values.

Fast Transitioning to a Stored Application Profile

Throughout the operation of the DSL system 2, applications may be activated and de-activated over time. This change in the active applications (i.e., via the activation or deactivation of an application) is known by the transceiver 10 (or receiver) and therefore does not need to be identified with a Fast Retrain as specified in the ITU G.922.1 and G.922.2 standards. Since the application profile is being changed because of a change in the active applications, and not because of a change in the channel conditions, there is no requirement to retrain retriever functions, such as echo cancellars, equalizers, etc., as is done in a Fast Retrain.

Storing application profiles for subsequent use shortens the handshake between the transceivers 10, 14, used by the transceivers 10, 14 to transition to another application profile because the transceivers do not have to undergo the process of creating, exchanging, and storing a new application profile.

The remote DMT transceiver 10 or the CO transceiver 14, and either the receiver or the transmitter of that transceiver 10, 14 can initiate the transition. Stored application profiles are identified so that the transmitter and the receiver simply notify the other as to which profile is to be used. The information associated with the application profile does not have to be transmitted again. In one embodiment, the stored application profiles are numbered. Accordingly, one transceiver simply specifies the number of the desired application profile to the other transceiver.

Receiver-Initiated Fast Application Profile Transition

Figure 4:
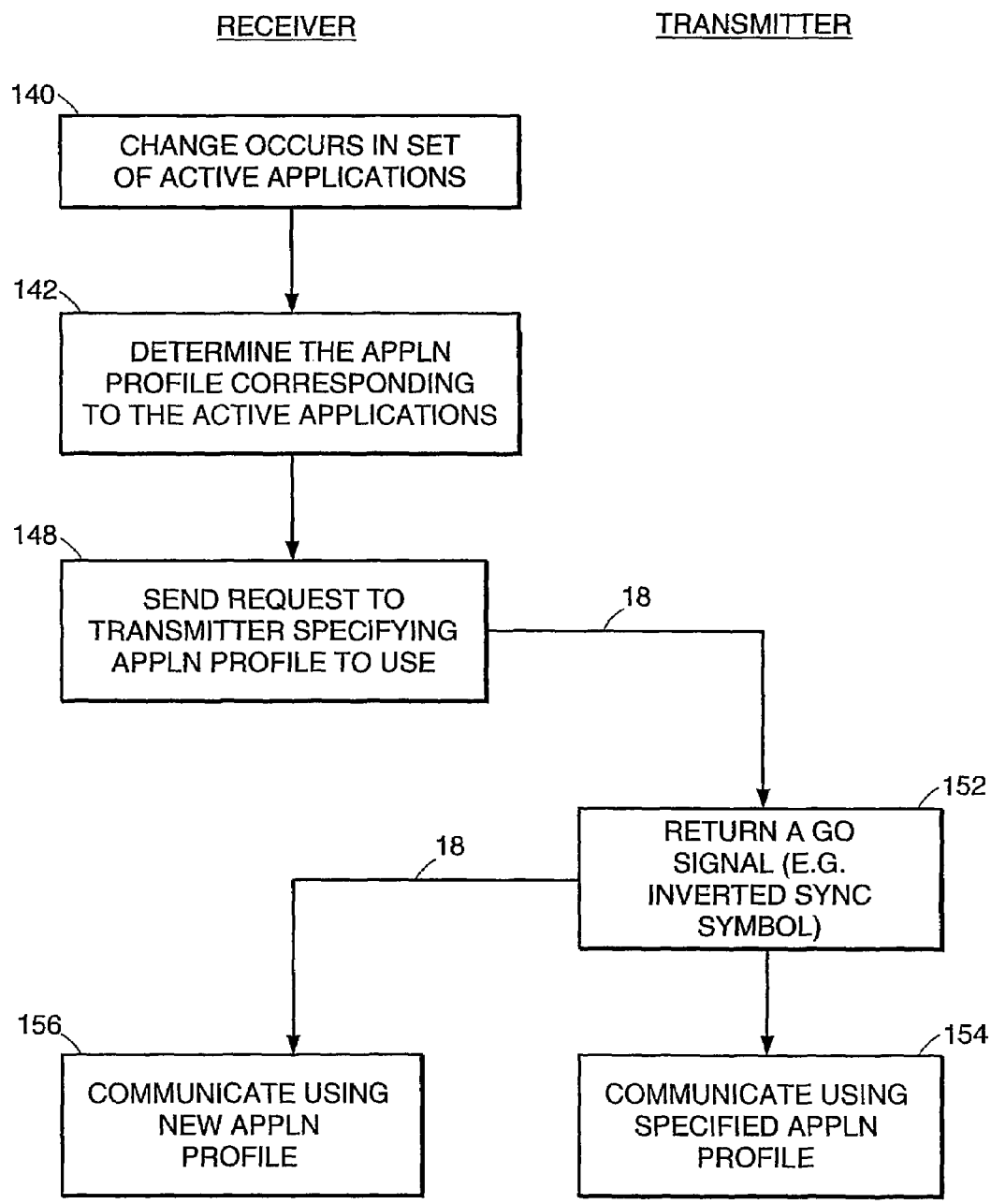
FIG. 4 is a flow diagram of an embodiment of a receiver-initiated process used by the remote DMT transceiver and the CO transceiver to transition to a stored application profile.

FIG. 4 shows an embodiment of a receiver-initiated process used by the remote DMT transceiver 10 and the CO transceiver 14 to transition to a stored application profile. Although the process is shown from the perspective of the receiver 26 of the remote DMT transceiver 10, it is to be understood that the receiver 42 of the CO transceiver 14 can also initiate the transition. In one embodiment, a change in the set of currently active applications occurs (step 140), requiring a transition to another application profile. The change may be the result of an application that has been activated or deactivated, or of an existing application that requires additional bandwidth (e.g., a second voice channel opens for a voice application that previously had only one voice channel).

After the change in the active applications, the receiver 26 determines (step 142) which application profile corresponds to the current set of active applications. The receiver 26 sends (step 148) a message to the transmitter 38 using the AOC or EOC channel specifying the stored application profile that is to be used for transmission based on this current set of active applications. This message corresponds to a request by the receiver 26. For example, if the transceivers 10, 14 are communicating according to AP #1 (FIG. 1) when a voice telephone call is activated, the receiver 26 sends the request to the transmitter 38 requesting a transition to AP #4 (FIG. 1). In one embodiment, the request identifies the AP #4 by the numeral 4.

After receiving the request, the transmitter 38 sends (step 152) an inverted sync symbol as a flag to signal the receiver 26 that the requested stored application profile is about to be used for transmission and to synchronize its use. The transmitter 38 uses (step 154) its stored copy of the specified application profile for transmission on the first frame, or on a predetermined number of frames, following the inverted sync symbol. This inverted sync signal corresponds to a "Go" message sent by the transmitter 38. The receiver 26 detects (step 156) the inverted sync symbol and, in synchronization with the transmitter 38, uses the specified application profile upon the first frame, or the predetermined number of frames, received after the inverted sync symbol.

The inverted sync symbol is a sync symbol in which the phase information in the QAM signal is shifted by 180 degrees. Phase shifts of the sync symbol other than 180 degrees can also be used for the "Go" message. The sync symbol is defined in the ANSI and ITU standards as a fixed non-data carrying DMT symbol that is transmitted every 69 symbols. The sync symbol is constructed by modulating all the DMT carriers with a predefined pseudo-random number sequence using basic QPSK (2 bit QAM) modulation. This sync symbol signal, which is used throughout the transceiver initialization process, has special autocorrelation properties that make possible the detection of the sync symbol and the inverted sync symbol even in highly noisy environments.

Because of its near invulnerability to channel noise, use of the inverted sync symbol to synchronize use of the new application profile by the transceivers 10, 14 is more robust than using the EOC or AOC channel. In contrast, messages sent over the EOC or AOC channel can be more easily corrupted by noise on the communication channel 18 than the inverted sync symbol. These overhead channels are multiplexed into the data stream at the framer 72 and therefore are, transmitted with quadrature amplitude modulation over a finite number of DMT subchannels. Impulse noise or other noise occurring on the communication channel 18 can cause bit errors in the EOC or AOC channel message, causing the message to be lost. Notwithstanding this sensitivity of the EOC or AOC channel to noise, which is greater than that of the inverted sync symbol, in one embodiment the EOC or AOC channel is used to communicate the "Go" message.

Receiver-initiated transitioning to a stored application profile completes quickly, requiring the exchange of only two messages (the request and the "Go" message) because the appropriate application profile is stored and does not need to be exchanged. Again, use of the inverted sync symbol as the "Go" message makes the synchronization between the transceivers 10, 14 robust in noisy environments.

Transmitter-initiated Fast Application Profile Transition

Figure 5:
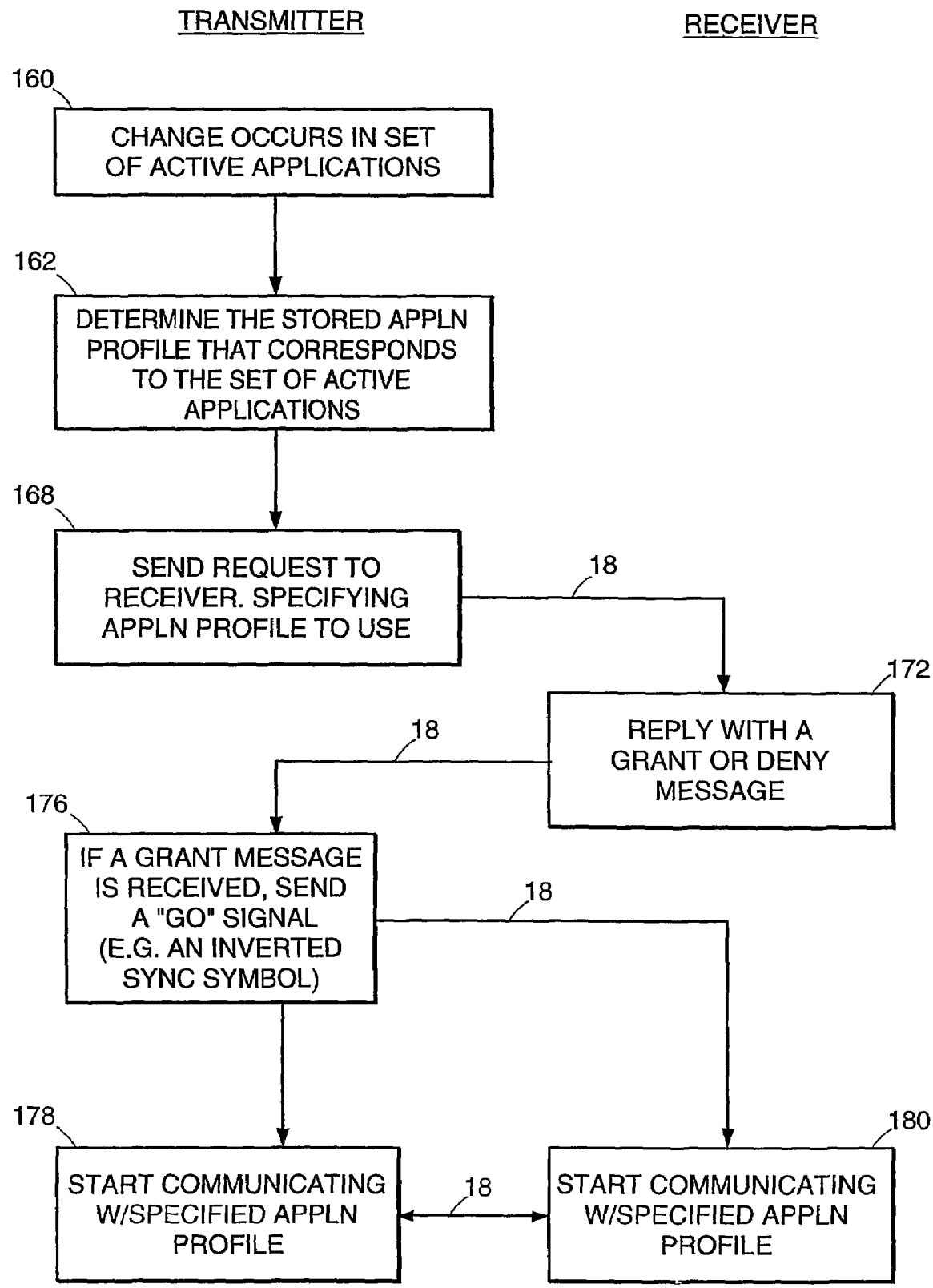
FIG. 5 is a flow diagram of an embodiment of a transmitter-initiated process used by the remote DMT transceiver and the CO transceiver to transition to a stored application profile.

FIG. 5 shows an embodiment of a transmitter-initiated process used by the remote DMT transceiver 10 and the CO transceiver 14 to transition to a stored application profile. Although the process is shown from the perspective of the transmitter 22 of the remote DMT transceiver 10, it is to be understood that the transmitter 38 of the CO transceiver 14 can also initiate the transition. As before, a change in the set of currently active applications occurs (step 160), requiring a transition to another application profile. Again, the change may be the result of an application that has been activated or deactivated, or of an existing application that requires additional bandwidth (e.g., a second voice channel opens for a voice application that previously had only one voice channel).

After the change in active applications the transmitter 22 determines (step 162) which application profile corresponds to the current set of applications. The transmitter 22 sends (step 168) a message to the receiver 42 using the AOC or EOC channel specifying the stored application profile that is to be used for transmission based on the current set of active applications. The message can identify the appropriate stored application profile by number or by any other identification uniquely associated with that stored application profile. This message corresponds to a request by the transmitter 22. After receiving the request, the receiver 42 returns (step 172) a "grant" or "deny" message to the transmitter 22.

If the transmitter 22 receives the "grant" message, the transmitter 22 sends (step 176) an inverted sync symbol as a flag to signal the receiver 42 that the requested stored application profile will be used for transmission. The transmitter 22 then uses (step 178) its stored copy of the specified application profile for transmission on the first frame, or a predetermined number of frames, following the inverted sync symbol. The inverted sync signal corresponds to a "Go" message sent by the transmitter 22. The receiver 42 detects (step 180) the inverted sync symbol ("Go") and starts communicating using the specified application profile for reception on the first frame, or a predetermined number of frames, following the inverted sync symbol in synchronization with the transmitter 22.

Transmitter-initiated transitions to a stored application profile completes quickly, requiring the exchange of three messages (the request, the deny or grant message, and the Go message) when transmitter-initiated, because the appropriate application profile is stored and does not need to be exchanged. Again, use of the inverted sync symbol as the "Go" message makes the synchronization between the transceivers 10, 14 robust in noisy environments.

In another embodiment, the transceivers 10, 14 transition to a stored application profile using the "Fast Retrain" protocol described in the ITU G.922.2 specification, or a similar fast initialization protocol that interrupts the application data communication between the transceivers 10, 14 in order to train and exchange transmission information between transceivers. The Fast Retrain causes a 1 to 2 second disconnection between the transceivers 10, 14.

Updating Application Profiles

Under certain circumstances, the contents of a stored application profile 34 (and the corresponding application profile 50) may require updating. For example, communication channel 18 conditions can change, (e.g., a telephone goes off the hook), which result in an increase or decrease in the data rate capabilities of the channel 18 and a different bit capacity of certain subchannels of the channel 18. The transceivers 10, 14 then need to update all stored application profiles that specify the bit capacity of the affected subchannels. In one embodiment, each transceiver 10, 14 locally updates its own stored copy of the affected application profile without exchanging the update information with each other. In another embodiment, the transceivers 10, 14 exchange the update information with each other.

While the invention has been shown and described with reference to specific preferred embodiments, it should be understood by those skilled in the art that various changes in form and detail may be made therein without departing from the spirit and scope of the invention as defined by the following claims. For example, although the invention is described with respect to DMT modulation, the principles of the invention also apply to DWMT (Discrete Wavelet Multitone) modulation. Also, IP frames instead of ATM packets can be used to transport data. Further, although the specification uses ADSL to describe the invention, it is to be understood that any form of DSL can be used, i.e., VDSL, SDSL, HDSL, HDSL2, or SHDSL. The principles of the invention also apply to any DMT communication system that supports multiple sets of applications, where the applications are activated and de-activated over time. Although several embodiments described above included Internet and voice applications, it is also to be understood that the principles of the invention apply to any combination of applications transported over DSL systems (e.g., telecommuting, video conferencing, high speed Internet access, video-on demand).

The invention claimed is:

1. A communication system, comprising:
a first transceiver configured to detect a change in a first set of active applications, the change resulting in a second set of active applications, wherein the first transceiver is configured to determine an application profile for use with the second set of active applications in response to the detected change, the determined application profile including stored transmission parameters used for communications; and
a second transceiver configured to: receive a request to switch to the determined application profile; retrieve the stored transmission parameters associated with the determined application profile; acknowledge the request to switch; and automatically switch to and use the determined application profile to communicate with the first transceiver.

2. The system of claim 1, wherein the first set of active applications includes a fixed data rate application or a variable data rate application.

3. The system of claim 2, wherein the variable data rate application is a digital data application and the fixed data rate application is a voice telephony application.

4. The system of claim 1, wherein the first transceiver is further configured to send a message to the second transceiver to request the switch to the determined application profile.

5. The system of claim 4, wherein the message includes an identifier associated with the determined application profile.

6. A transceiver for use in a multicarrier transmission system, the transceiver comprising:
a storage module configured to store a plurality of application profiles, each application profile including a plurality of transmission parameters; and
a transmitter coupled to the storage module, the transmitter configured to detect a change in a first set of active applications associated with a first application profile included in the plurality of application profiles, wherein the change results in a second set of active applications, the transmitter further configured to determine a second application profile associated with the second set of active applications, and to automatically switch to and use the second application profile in communications associated with the second set of active applications.

7. The transceiver of claim 6, wherein the plurality of transmission parameters includes transmission data rate, number of bits allocated to each subchannel in a communication channel used for an application in the first or second set of active applications, or a framing mode for the application.

8. The transceiver of claim 6, wherein the plurality of application profiles is preconfigured in the storage module.

9. The transceiver of claim 6, wherein the transceiver is further configured to locally generate a parameter of the plurality of transmission parameters.

10. The transceiver of claim 6, wherein the transceiver is further configured to generate the second application profile and to associate the second application profile with the second set of active applications if the transceiver detects the change to the first set of active applications.

11. A transceiver for use in a multicarrier transmission system, the transceiver comprising:
a storage module for storing a plurality of application profiles, each application profile including a plurality of transmission parameters; and
a receiver coupled to the storage module, the receiver configured to receive a request to switch from a first application profile associated with a first set of active applications to a second application profile associated with a second set of active applications, to retrieve at least one of the plurality of transmission parameters included in the second application profile, to acknowledge the request to switch to the second application profile, and to automatically switch to and use the second application profile in communications associated with the second set of active applications.

12. The transceiver of claim 11, wherein the receiver is configured to acknowledge the request to switch to the second application profile using an inverted sync symbol.

13. The transceiver of claim 11, wherein the request to switch to the second application profile includes an identifier associated with the second application profile.

14. The transceiver of claim 11, wherein the receiver is further configured to locally generate a parameter of the plurality of transmission parameters included in the second application profile.

15. A method of supporting a plurality of applications in a multicarrier transmission system, the method comprising:
detecting a change in a first set of active applications associated with a first application profile, wherein the first application profile includes a first plurality of transmission parameters, and wherein the change in the first set of active applications results in a second set of active applications;
determining a second application profile associated with the second set of active applications, wherein the second application profile includes a second plurality of transmission parameters; and
automatically switching to the second application profile in communications associated with the second set of active applications.

16. The method of claim 15, wherein the detecting a change in the first set of active applications comprises detecting an addition or deletion of an application to or from the first set of active applications, respectively.

17. The method of claim 15, wherein the detecting a change in the first set of active applications comprises detecting an application in the first set of active applications requiring more communication bandwidth.

18. The method of claim 15, wherein the determining a second application profile comprises generating a parameter of the second plurality of transmission parameters.

19. A method of supporting a plurality of applications in a multicarrier transmission system, the method comprising:
receiving a request to switch from a first application profile associated with a first set of active applications to a second application profile associated with a second set of active applications, wherein the first application profile includes a first plurality of transmission parameters and the second application profile includes a second plurality of transmission parameters and;

retrieving a parameter of the second plurality of transmission parameters included in the second application profile;

acknowledging the request to switch to the second application profile; and automatically switching to and using the second application profile in communications associated with the second set of active applications.

20. The method of claim 19, wherein the receiving a request to switch from a first application profile comprises receiving a request that includes an identifier associated with the second application profile.

21. The method of claim 19, wherein the first and second pluralities of transmission parameters include communication subchannels allocated for reception by the receiver, number of bits allocated to each of the subchannels, performance margins, or fine-gain adjustments for each of the subchannels.

22. The method of claim 19, wherein the acknowledging the request to switch comprises sending an inverted sync symbol.

23. The system of claim 1, wherein the second set of active applications includes a fixed data rate application or a variable data rate application.

24. The system of claim 23, wherein the variable data rate application is a digital data application and the fixed data rate application is a voice telephony application.

25. The transceiver of claim 7, wherein both the first and the second set of active applications includes the application.

* * * * *